Patented June 24, 1930

1,767,379

UNITED STATES PATENT OFFICE

HANS KRZIKALLA AND HANS KÄMMERER, OF MANNHEIM, GERMANY, ASSIGNORS TO GENERAL ANILINE WORKS, INC., OF NEW YORK, N. Y., A CORPORATION OF DELAWARE

PROCESS OF TREATING COMPLEX METALLIC COMPOUNDS OF O-HYDROXYAZO DYESTUFFS

No Drawing. Application filed March 24, 1927, Serial No. 178,130, and in Germany March 31, 1926.

We have found that complex metallic compounds of o-hydroxyazo dyestuffs, other than the dyestuff obtainable from the diazo compound of 1-amina-2-naphthol-4-sulfonic acid and alphanaphthol, may be transformed into products possessing considerably modified properties, by treating them with chemical agents capable of reacting with, but not destroying the complex dyestuff compound. Thus, for example, the properties of these complex metal compounds may be greatly influenced by the introduction of substituents into the complex dyestuff compounds, or by varying the substituents already present therein. We have found that the stability of the complex metallic compounds of o-hydroxyazo dyestuffs, in particular of the chromium compounds, is such that all reactions which may be applied to the dyestuffs themselves may be carried out with the metal compounds without destroying the complex.

For example chromium compounds of the said dyestuffs, which also contain nitro groups, can be treated with reducing agents without destroying the metallic complex. Depending on the reducing agents employed, the nitro groups may, for example, be transformed into amino or azoxy groups, thereby modifying the shade, the property of producing even dyeings and the affinity of the dyestuffs. Moreover, complex metallic compounds of o-hydroxyazo dyestuffs, containing free amino groups—such as those obtained by the reduction of nitro derivatives, as already mentioned, or such as can be produced for example from aminonaphthol sulfonic acids by alkaline coupling with diazo compounds— can be treated, without injury to the metallic complex, with acylating, alkylating or arylating agents, or other agents capable of modifying the amino groups. Acetylation or benzoylation or other acylation usually lightens the shade, and it is possible to obtain in the manner herein mentioned, for example, acetylated complex chromium compounds, which are difficult, if not impossible, (owing to the risk of saponification) to produce by the introduction of chromium into dyestuffs containing acetylamino groups.

Several molecules of the complex metallic compounds of o-hydroxyazo dyestuffs containing amino groups can be linked together by treatment with phosgene, by which treatment especially the affinity of the dyestuffs for cotton is increased.

The following examples will further illustrate how the said invention may be carried into practical effect but the invention is not limited to these examples. The parts are by weight.

Example 1

47 parts of the complex chromium compound of the azo dyestuff prepared by alkaline coupling of diazotized p-chlor-o-aminophenol and with 1-amino-8-naphthol-3.6-disulfonic acid are dissolved in water, and treated with about 15 parts of acetic anhydrid at a temperature of 70° C. A change of tone from greenish-blue to a blue with a reddish tinge occurs. After acetylation is completed the product is salted out and filtered off by suction. It corresponds most probably to the following formula:

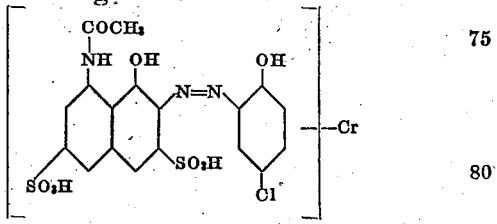

The dyeings produced by the resulting dyestuff on wool have a more reddish shade than those obtained from the original dyestuff.

Example 2

77 parts of the complex chromium compound of the azo dyestuff obtainable from p-nitro-o-aminophenol-o-sulfonic acid and beta-naphthol are dissolved in water and stirred with 42 parts of crystalline sodium sulfid until reduction is complete. The mixture is then neutralized with acid, salted out and filtered. The reaction product corresponds most probably to the following formula:

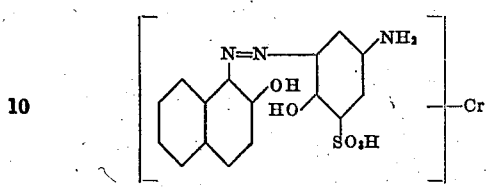

A fast dyestuff, producing very even dyeings, is obtained which dyes wool bluish-grey in weak shades—whereas the original dyestuff gives violet-brown dyeings on wool.

The complex metal compounds of many other o-hydroxyazo dyestuffs can be reduced in a similar manner, with not only a change of shade, but also—in almost all cases—an improvement in the properties of dyeing evenly of the dyestuffs. In the case of dyestuffs containing a plurality of nitro groups, for example picramic acid dyestuffs, one or more of the nitro groups may be reduced by varying the amount of the reducing agent, thus influencing the dyestuff in various ways at will.

The aforesaid dyestuff obtainable by reducing the chromium compound of the dyestuff obtained from p-nitro-o-amino-phenol-o-sulfonic acid and beta-naphthol can be transformed, by acetylation in the manner described in Example 1, into a product which dyes wool shades with a more reddish tinge than the unacetylated dyestuff.

*Example 3*

44 parts of the complex chromium compound of the nitrated azo dyestuff from 1-amino-2-naphthol-4-sulfonic acid and β-napthol are dissolved in a small quantity of water, 20 parts of caustic soda solution (40° Bé.) being added, followed by 40 parts of grape sugar in concentrated solution. The mixture is stirred for about 30 hours, neutralized with acid and filtered. A dyestuff is obtained which gives fast, dark blue shades on wool. It corresponds most probably to the following formula:

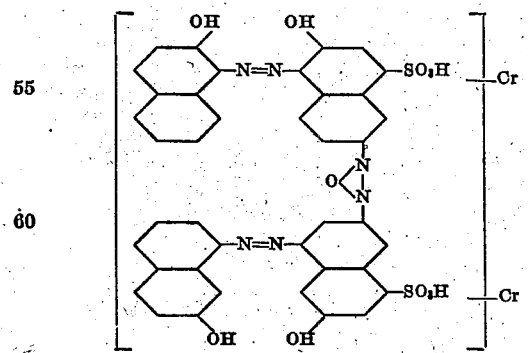

*Example 4*

50 parts of the complex copper compound of the azodyestuff obtainable by alkaline coupling of picramic acid with 1-amino-8-naphthol-3.6-disulfonic acid, are dissolved in water and stirred with about 25 parts of acetic anhydride at a temperature of 70° C. After acetylation is completed, the mixture is salted out and filtered off by suction. Like the dyestuff obtained according to Example 1 the resulting product has a more reddish shade than the original dyestuff. It corresponds most probably to the following formula:

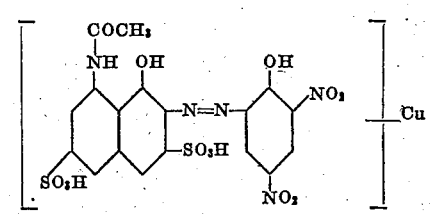

*Example 5*

40 parts of the complex chromium compound of the azo dyestuff obtainable from diazotized 4-nitro-2-amino-phenol and 2-amino-8-naphthol-6-sulfonic acid are boiled for some time in an aqueous solution with 20 parts of dinitro-chlor-benzene with an addition of 15 parts of sodium carbonate. The resulting dyestuff is separated in the usual manner. It dyes wool fast brown shades.

*Example 6*

47 parts of the complex chromium compound of the azodyestuff obtainable from diazotized 4-nitro-2-amino-phenol and 1-amino-8-naphthol-3.6-disulfonic acid by coupling in an alkaline solution are dissolved in water, diazotized in an acid solution with the calculated quantity of sodium nitrite, boiled until diazo compound is no longer present, neutralized and salted out or evaporated. The resulting dyestuff containing a hydroxyl group instead of the amino group of the initial dyestuff dyes more reddish shades than the initial material.

We claim:
1. The process which comprises treating with a reducing agent a complex metallic compound of an ortho-hydroxy-azodyestuff containing at least one nitro group.
2. The process which comprises treating a complex metallic compound of an ortho-hydroxy-azo-dyestuff containing at least one nitro group with a reducing agent to the corresponding amino compound and acylating the resulting product.
3. The process which comprises treating a complex chromium compound of an ortho-hydroxy-azodyestuff containing at least one nitro group with sodium sulfid until the reduction is complete.

4. The process which comprises treating a complex chromium compound of an ortho-hydroxy-azodyestuff containing at least one nitro group with sodium sulfid to the corresponding amino compound and acylating the resulting product by treating it with acetic anhydride.

5. As a new article of manufacture, the complex chromium compound corresponding probably to the formula:

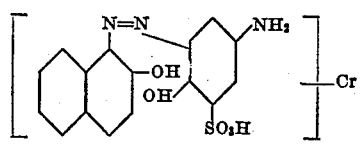

dyeing wool weak bluish grey shades, and obtainable by reducing the complex chromium compound of the azodyestuff from diazotized p-ntro-o-aminophenol-o-sulfonic acid and β-naphthol by means of an aqueous solution of sodium sulfid.

In testimony whereof we have hereunto set our hands.

HANS KRZIKALLA.
HANS KÄMMERER.